United States Patent [19]
Herbert et al.

[11] Patent Number: 5,147,415
[45] Date of Patent: Sep. 15, 1992

[54] PROCESS OF TREATING THE GASES PRODUCED BY THE GASIFICATION OF SOLID FINE-GRAINED FUELS

[75] Inventors: Peter Herbert, Frankfurt am Main; Horst Mielke, Neu-Isenburg; Gerhard Schmitt, Schmitten, all of Fed. Rep. of Germany

[73] Assignee: Metallgesellschaft Aktiengesellschaft, Frankfurt am Main, Fed. Rep. of Germany

[21] Appl. No.: 574,983

[22] Filed: Aug. 29, 1990

[30] Foreign Application Priority Data

Sep. 8, 1989 [DE] Fed. Rep. of Germany ....... 3929926

[51] Int. Cl.$^5$ .................... C10J 3/46; C10K 1/04; C10K 10/06; C10K 1/10
[52] U.S. Cl. .................... 48/197 R; 48/203; 48/206
[58] Field of Search ............ 48/197 R, 202, 203, 48/206, 210; 423/235, 237, 238; 55/70; 210/758; 252/373

[56] References Cited

U.S. PATENT DOCUMENTS

| | | | |
|---|---|---|---|
| 825,297 | 7/1906 | Brunck | 55/70 |
| 3,540,189 | 11/1970 | Siewers et al. | 55/70 |
| 3,966,633 | 6/1976 | Friedman | 48/197 R |
| 3,966,634 | 6/1976 | Sacks | 48/197 R |
| 3,971,635 | 7/1976 | Matthews | 48/197 R |
| 4,002,565 | 1/1977 | Farrell et al. | 55/70 |
| 4,175,929 | 11/1979 | Frumerman et al. | 48/202 |
| 4,211,540 | 7/1980 | Netzer | 48/202 |
| 4,347,064 | 8/1982 | Reh et al. | 48/197 R |
| 4,368,057 | 1/1983 | Matthews | 48/197 R |
| 4,438,082 | 3/1984 | Dettling et al. | 423/235 |
| 4,444,568 | 4/1984 | Beisswenger et al. | 48/206 |
| 4,473,537 | 9/1984 | Ford et al. | 423/235 |
| 4,565,679 | 1/1986 | Michalak et al. | 423/235 |
| 4,731,099 | 3/1988 | Ergezinger | 48/197 R |
| 4,732,743 | 3/1988 | Schmidt et al. | 423/255 |
| 4,963,332 | 10/1990 | Brand et al. | 423/235 |
| 5,041,144 | 8/1991 | Lath | 48/197 R |

*Primary Examiner*—Peter Kratz
*Attorney, Agent, or Firm*—Sprung Horn Kramer & Woods

[57] ABSTRACT

Fine-grained fuels are gasified in a fluidized state with a mixture of gasifying agents which comprise oxygen, water vapor and/or carbon dioxide. $NH_3$ is substantially entirely removed from the product gas from the gasifier. All or part of the $NH_3$ is combusted and any remaining $NH_3$ is added to the exhaust gas from the combustor. In a preferred embodiment the content of nitrogen oxides and/or $NH_3$ in the exhaust gas from the combustor and $NH_3$ is supplied to the combustor at such a controlled rate that the contents of nitrogen oxides and $NH_3$ in the exhaust gas to which $NH_3$ has been admixed are minimized.

5 Claims, 1 Drawing Sheet

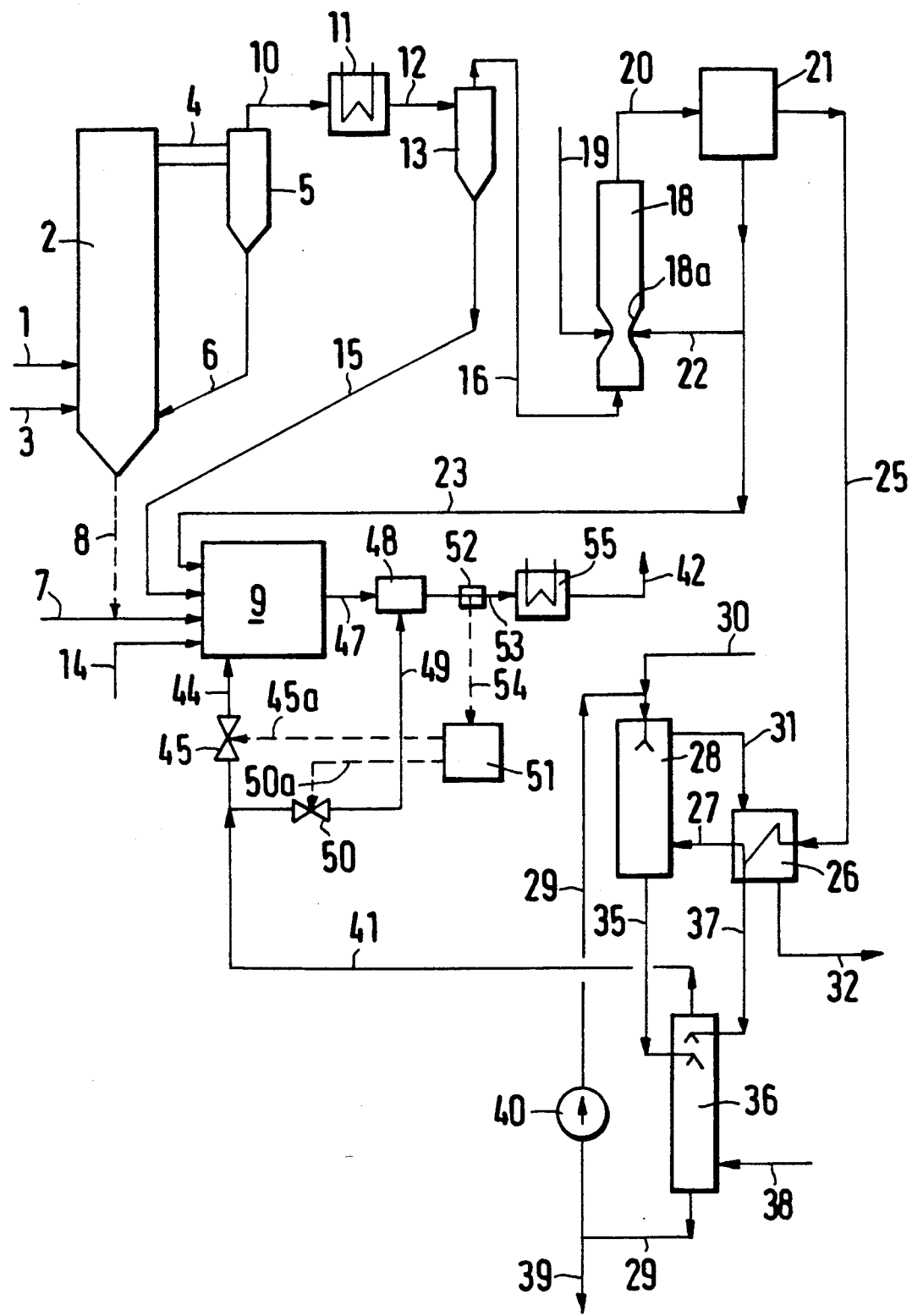

PROCESS OF TREATING THE GASES PRODUCED BY THE GASIFICATION OF SOLID FINE-GRAINED FUELS

DESCRIPTION

This invention relates to a process of treating the gases produced by the gasification of solid fine-grained fuels in fluidizing contact with a mixture of gasifying agents comprising oxygen and also water vapor and/or carbon dioxide, wherein a product gas that comprises carbon oxides, hydrogen, methane and $NH_3$ is withdrawn from the gasifier.

The gasification of solid fine-grained fuels in a fluidizing bed is described in European Patent 0 008 469 and the corresponding U.S. Pat. No. 4,347,064. It is an object of the invention to ensure in such or similar processes that the gasification and the use of the product gas can be effected in a manner which is friendly to the environment and particularly without an emission of disturbing quantities of nitrogen oxides. In the process described first hereinbefore this is accomplished in accordance with the invention in that $NH_3$ is substantially entirely removed from the product gas produced by the gasification, the $NH_3$ is combusted entirely or in part, and any remaining $NH_3$ is admixed to the exhaust gas produced by the combustion. As a result, said exhaust gas can be kept substantially free of nitrogen oxides even when $NH_3$ must be destroyed at a high rate.

The $NH_3$ is desirably combusted together with an additional fuel, which may be solid, liquid or gaseous. Any solid carbonaceous residue which is formed by the gasification may be used alone or together with other fuels as an additional fuel.

In a desirable processing, the content of nitrogen oxide and/or $NH_3$ in the exhaust gas is measured and the rates at which $NH_3$ is supplied for the combustion and for the admixing with the exhaust gas is so controlled that the contents of nitrogen oxides and $NH_3$ in the exhaust gas to which $NH_3$ has been admixed are minimized. In that case, even $NH_3$ which has been removed at a high rate from the product gas produced by the gasification can be eliminated in such a manner that the exhaust gas can directly be discharged into the atmosphere because it has no disturbing content of nitrogen oxides or $NH_3$. This will be possible even if the combustor for the $NH_3$ is only small.

The $NH_3$ is preferably removed to such a high degree from the product gas produced by the gasification that a subsequent combustion of the product gas, e.g., in a power plant, will not result in a production of nitrogen oxides at disturbing rates. Because the flue gas from the power plant does not contain the "chemical $NO_x$" that has been formed by an oxidation of $NH_3$, that power plant flue gas has only a low content of nitrogen oxides.

The $NH_3$ is suitably removed from the product gas by a scrubbing process, particularly with water, because $NH_3$ is highly solwable in water. The resulting ammoniacal water may be injected in part directly into the combustor for the gasification residue and the remainder may be injected into the exhaust gas which is thus produced. Alternatively, the $NH_3$ may be driven out of the ammoniacal water, e.g., in that the ammoniacal water is stripped with water vapor. In that case the $NH_3$ will be obtained in a relatively high concentration so that it can subsequently be combusted to form $N_2$, $H_2O$ and $NO_x$ and the resulting nitrogen oxides may be reduced by means of the remaining $NH_3$ to produce nitrogen and water in the exhaust gas produced by the combustion.

If it is desired to eliminate the nitrogen oxides in the exhaust gas by an injection of ammoniacal water, it is recommended to use a catalyst at temperatures from 200° to 500° C. Catalysts known per se are used for that purpose and may consist, e.g., of $TiO_2$ and vanadium. If a use of catalysts in the exhaust gas is not desired, temperatures from about 700° to 1200° C. and particularly of about 800° C. will desirably be employed and gaseous $NH_3$, optionally in a mixture with stripping steam, will be admixed to the exhaust gas.

Optional further features of the process will be explained with reference to the drawing.

The fuels to be gasified are fine-grained to dustlike and particularly consist of coal and have particle sizes below about 6 mm. The gasification is effected under a pressure in the range from 1 to 120 bars. During the gasification the fuels are in fluidizing contact with a mixture of gasifying agents comprising oxygen and also water vapor and/or carbon dioxide. The gasification may be effected, e.g., in a fluidized bed, a circulating fluidized bed, or a pneumatic conveyor. The coal is fed in line 1 to the gasification reactor 2, which is supplied through line 3 also with the oxygen-containing mixture of gasifying agents. A solids-containing product gas is fed through the duct 4 to a cyclone 5, in which the solids are substantially entirely removed; they are recycled in line 6 to the reactor 2. If the solid residue left after the gasification has an adequate carbon content, that residue will be withdrawn in line 8 and fed to a combustor 9. Additional fuel for the combustor 9 comes from line 7 and combustion air is fed in line 14. The combustor 9 must process fuel only at a relatively low rate and may consist in a manner known per se, e.g., of a fluidizing bed unit, a circulating fluidizing bed system, a traveling grate furnace, a slag tap firing system or a gas burner.

The product gas from the cyclone 5 is fed in line 10 first to a heat exchanger 11, such as a waste-heat boiler, in which the gas arriving at temperatures from 700° to 1500° C. is cooled to temperatures of about 200° to 500° C. The cooled gas flows in line 12 to a further cyclone 13, in which additional solids are separated. The thus separated solids are preferably also fed in line 15 to the combustor 9.

The gas which leaves the cyclone 13 in line 16 is substantially free of solids and in addition to carbon oxides, hydrogen and possibly small amounts of methane contains mainly $NH_3$, additional N compounds and also halogen compounds. For this reason the gas is first fed to a dehalogenating reactor 18, which is supplied in line 19 with $Ca(OH)_2$ and/or $CaO$, preferably as fine-grained solids. Calcium halides, mainly calcium chloride and calcium fluoride, are produced in the reactor 18 and are entrained by the gas in line 20 to a filter 21, in which the solids which contain unreacted $Ca(OH)_2$ and/or $CaO$ are separated. Part of the separated solids is recycled in line 22 to the reactor 18 and any surplus solids is recycled in line 22 to the reactor 18 and any surplus solids are fed in line 23 also to the combustor 9. The filter 21 may consist, e.g., of an electrostatic precipitator or a bag filter. To improve the contact between gas and solids the reactor 18 has a region 18a which has a smaller cross-section of flow to produce a venturi action resulting in a higher turbulence.

The product gas which has been purified in the filter 21 is usually at temperatures of about 200° to 500° C. and still has a disturbingly high content of $NH_3$. The product gas is fed in line 25 to a heat exchanger 26, where it is cooled and from which it is fed in line 27 to a scrubbing vessel 28, in which the gas is scrubbed with water. Recycled ammoniacal water is fed in line 29 and any fresh water which may be required is fed in line 30. In the vessel 28, water is sprayed into the gas and the contact between gas and water may be improved by elements known per se for promoting a mass transfer. The product gas from which substantially all $NH_3$ has been removed leaves the scrubbing vessel through line 31 and is reheated in the heat exchanger 26 and is fed in line 32 to means for the further utilization of the gas. For instance, the gas in line 32 may be fed to a power plant, in which the gas is combusted and is passed through a turbine. Because the gas has a low $NH_3$ content, which is, e.g., not in excess of 20 ppm, the combustion will hardly result in a formation of any nitrogen oxide so that the flue gas can directly be discharged into the atmosphere.

The ammoniacal water which is drained in line 35 from the scrubbing vessel 28 is fed to a stripping column 36, which is also supplied in line 37 with condensate which has been formed in the heat exchanger 36. The stripping fluid may consist, e.g., of water vapor, which is fed in line 38. Treated water from which almost all ammonia has been removed is recycled in line 29 by means of the pump 40 to the scrubbing vessel 28. Any surplus water is removed through line 39.

Stripping vapor which contains $NH_3$ is withdrawn in line 41 from the top of the stripping column 36 and is used to ensure that the exhaust gas in line 42 will be virtually free of nitrogen oxides and $NH_3$. For that purpose a part of the mixture of $NH_3$ and stripping vapor is fed through line 44 and the flow control valve 45 to the combustor 9, in which the $NH_3$ is combusted entirely or in part, depending on the type of the combustor, to form $NO_x$. In the mixing zone 48, the remaining mixture of $NH_3$ and stripping vapor is added through line 49 and the flow control valve 50 to the $NO_x$-containing exhaust gas, which leaves the combustor 9 in line 47. The controller 51 is used to ensure that the exhaust gas which leaves the mixing zone 48 is virtually free of $NO_x$ and is also free of surplus $NH_3$. This is monitored by a sensor 52, from which measured-value signals are transmitted in the signal line 54 to the controller 51. By signals transmitted in signal lines 45a and 50a the controller 51 ensures that the mixture of $NH_3$ and stripping vapor is distributed to the lines 44 and 49 in the proper ratio so that the exhaust gas in line 53 is virtually free of $NH_3$ and $NO_x$, as is desired. The exhaust gas is cooled in the heat exchanger and is discharged through the line 42 into the atmosphere. Because the $NH_3$ which is supplied in line 41 is distributed to a line which directly leads to the combustor 9 and to a second line 49 which receives the exhaust gas from the combustor, even when $NH_3$ has been formed at a high rate, it can be rendered innocuous in that it is converted to the components nitrogen and water, which do not pollute the environment.

In an arrangement which differs from that shown on the drawing, surplus ammonical water which flows in the line 35 and which should not be fed to the top of the scrubbing vessel 28 may be conducted in line 41 and may directly be sprayed from branch lines 44 and 49 into the combustor 9 and into the mixing zone 48, respectively.

EXAMPLE

A processing system which corresponds to that shown on the drawing but in which the dehalogenating reactor 18 and the filter 21 have been omitted is operated as follows. The data stated hereinafter have been computed in part. A coal having a particle size from 0 to 6 mm and having the analysis

| | |
|---|---|
| C | 60.0% by weight |
| H | 4.0% by weight |
| O | 9.0% by weight |
| N | 1.5% by weight |
| S | 0.7% by weight |
| $H_2O$ | 18.0% by weight |
| Ash | 6.8% by weight | is gasified under a pressure of 22 bars in a reactor which is included in a circulating fluidized bed system. 36,500 kg coal, 85,500 kg air and 2,800 kg water vapor are fed to the reactor in each hour.

The data in the following Table indicate the gas rates, on a dry basis, in standard cubic meters ($sm^3$) per hour and the corresponding temperatures.

| Line | 10 | 25 | 38 | 41 | 44 | 49 | 53 |
|---|---|---|---|---|---|---|---|
| Gas rate ($sm^3/h$) | 100,000 | 100,000 | 2,500 | 1,800 | 1,500 | 300 | 45,000 |
| Temperature (°C.) | 910 | 350 | 170 | 100 | 100 | 100 | 350 |

The product gas in line 10 has the following composition on a dry basis:

| | |
|---|---|
| $CO_2$ | 7.5% by volume |
| CO | 22.2% by volume |
| $H_2$ | 15.7% by volume |
| $CH_4$ | 2.6% by volume |
| $N_2$ | 52.0% by volume |

That gas contains on a dry basis 2,300 mg $NH_3$ per $sm^3$. At a total rate of 9,000 kg/h, solid residue from the gasifier is fed to the fluidized-bed combustor 9 through lines 7 and 15. That solid residue contains about 50% by weight carbon. Additional fuel is not required. Flue gas at a rate of about 45,000 $sm^3/h$ is produced by the combustion with air.

The stripping column 36 is supplied in line 38 with water vapor as a stripping fluid. The gas mixture in line 41 consists of 16.5% by volume $NH_3$, 16,5% by volume $CO_2$ and 67% by volume $H_2O$. The exhaust gas in line 53 contains less than 100 ppm $NO_x$ and less than 5 ppm $NH_3$.

We claim:

1. A process for reducing the amount of $NH_3$ in a product gas produced by gasifying fine grained solid fuels in a fluidized state in a gasification zone, feeding an oxygen-containing gas and at least one gasifying agent selected from the group consisting of water vapor and carbon dioxide into said gasification zone, withdrawing said product gas containing carbon oxides, hydrogen, methane and $NH_3$ from said gasification zone, which comprises cooling said product gas and removing $NH_3$ from the cooled product gas, dividing the removed $NH_3$ into a first and a second portion, feeding said first portion into a combustion zone and together with an additional fuel combusting the NH$_3$ in said combustion zone, withdrawing from said combustion zone a first exhaust gas containing NO$_x$, feeding said first exhaust gas to a mixing zone and introducing said second portion into said mixing zone for reaction of NO$_x$ with NH$_3$, and withdrawing a second exhaust gas with reduced NO$_x$ content from said mixing zone.

2. Process of claim 1, wherein a carbonaceous solid residue is withdrawn from said gasification zone and said residue is fed into said combustion zone.

3. Process of claim 1, wherein the cooled product gas is scrubbed with water to remove NH$_3$ from said product gas and to produce an ammoniacal water solution, dividing said ammoniacal water solution into a first and a second portion, feeding said first portion of ammoniacal water solution into said combustion zone and feeding said second portion of ammoniacal water into said mixing zone.

4. Process of claim 1, wherein the cooled product gas is scrubbed with water to remove NH$_3$ from said product gas and to produce an ammoniacal water solution, stripping said ammoniacal water solution with a stripping fluid and producing a mixture of NH$_3$ and stripping fluid, feeding a portion of said mixture into said combustion zone and introducing the balance of said mixture into said mixing zone.

5. Process of claim 1, wherein in said second exhaust gas withdrawn from said mixing zone the content of NO$_x$ and/or NH$_3$ is measured and the amount of NH$_3$ fed into said combustion zone and into said mixing zone is controlled to minimize the amount of NH$_3$ and NO$_x$ in said second exhaust gas.

* * * * *